Sept. 23, 1969     R. C. HANSCOM, JR     3,468,111

FRUIT PICKER

Filed Oct. 23, 1965     3 Sheets-Sheet 1

INVENTOR.
RUSSELL C. HANSCOM, JR.
BY Hazard & Miller
ATTORNEYS

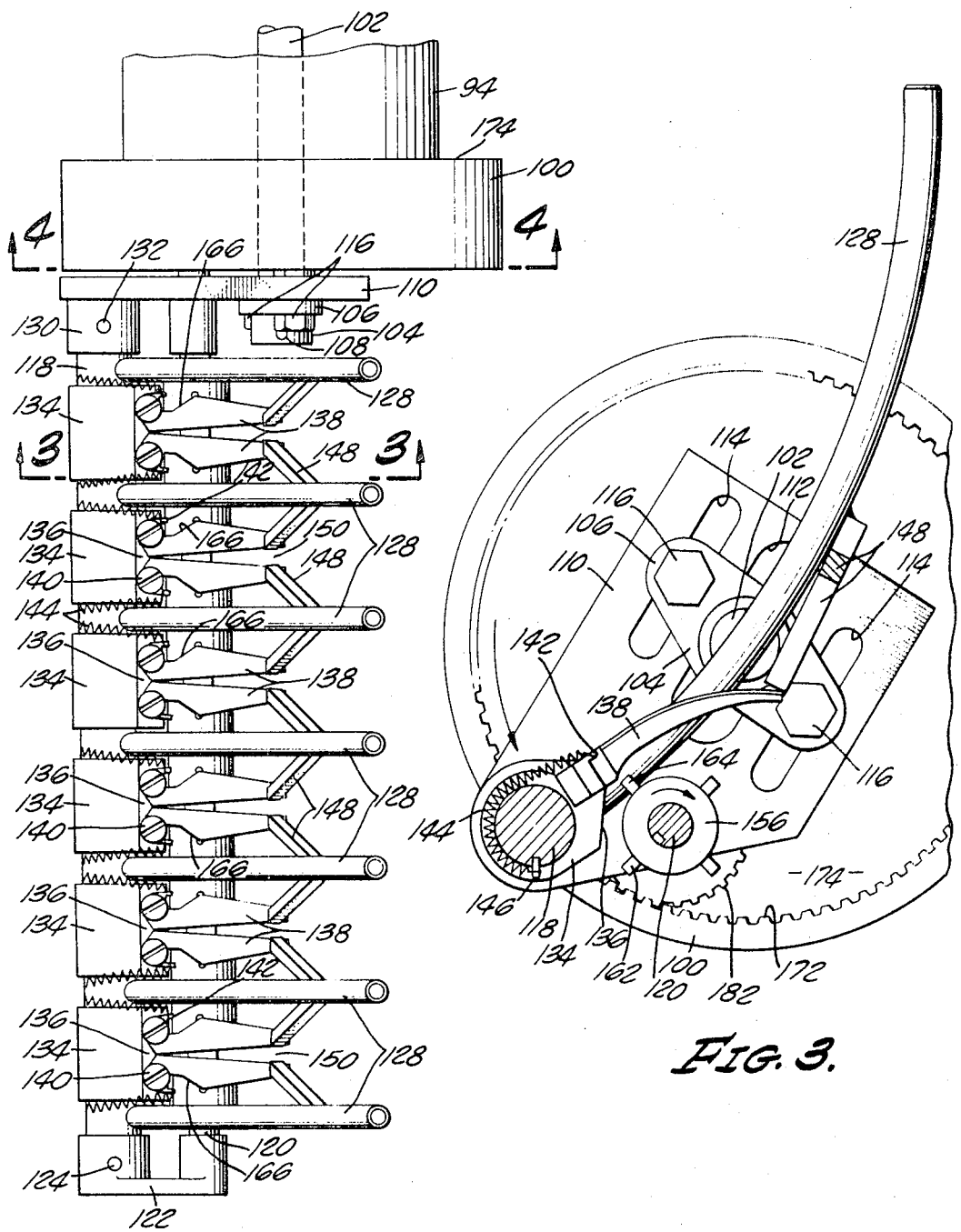

Sept. 23, 1969  R. C. HANSCOM, JR  3,468,111
FRUIT PICKER
Filed Oct. 23, 1965  3 Sheets-Sheet 3

INVENTOR.
RUSSELL C. HANSCOM, JR.
BY Hazard & Miller
ATTORNEYS

United States Patent Office 3,468,111
Patented Sept. 23, 1969

3,468,111
FRUIT PICKER
Russell C. Hanscom, Jr., Berkeley, Calif.
(1793 Grand Ave., Fillmore, Calif. 93015)
Filed Oct. 23, 1965, Ser. No. 503,111
Int. Cl. A01g 19/08
U.S. Cl. 56—328   6 Claims

ABSTRACT OF THE DISCLOSURE

A fruit picker having an orbital picker head with a picker comb with an adjustable orbital radius, and cutter means and cutter actuating means on the picker head, the cutter means being movable into and out of operative association with the cutter actuating means, it being movable into operative association with said cutter means upon pressure of the picker comb against the fruit to be picked.

---

This invention relates to a fruit picker and more particularly to apparatus for picking oranges.

The harvesting of oranges under present methods is expensive. Primarily they are hand-picked either from ordinary stepladders or from power operated movable platforms upon which the pickers stand, but in either case, hand labor is involved. Even with the use of power actuated platforms for the pickers, little if any time is satisfactory because of the difficulty in manipulating the saved because of the necessity for frequently interrupting the picking operation to adjust the platform to different positions vertically and circumferentially of the tree.

Several types of mechanical pickers eliminating hand labor have been developed, but they have not proven satisfactory because of the difficulty in manipulating the apparatus and also due to the fact that the fruit is removed from the entire stem, or the stem is not cut off sufficiently close to the fruit to prevent the remaining portion of the stem from puncturing adjacent fruit when it is packed.

It is a general object of the present invention to provide a picker for fruit, such as oranges, which is capable of ready and efficient manipulation to bring the picker head into proper relationship with the various portions of the tree; and wherein the fruit is brought into proper position relative to the cutter mechanism to cut the stem without undue removal of stems and branches; and wherein the stem is cut off close to the fruit so that injury will not result from penetration of adjacent fruit by the stems when the fruit is packed.

The above and other objects and advantages of the invention will more fully appear from the following description in connection with the accompanying drawings, in which:

FIG. 2 is an enlarged plan view of the picker head;

FIG. 3 is an enlarged sectional view taken approximately on the line 3—3 of FIG. 2;

Figure 1:
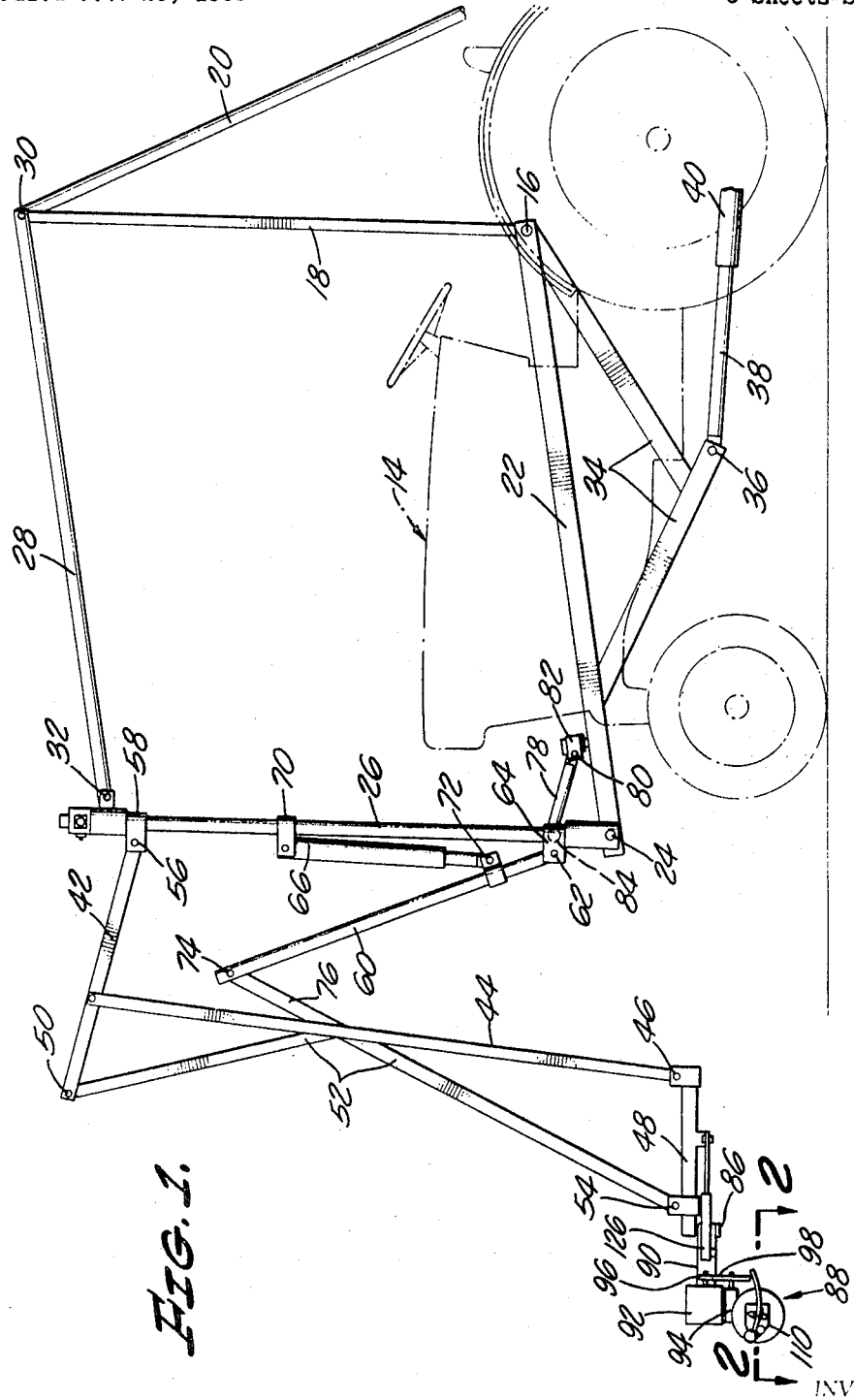
FIG. 1 is a side elevational view indicating a tractor in broken lines and an embodiment of the invention mounted thereupon.
Figure 8:
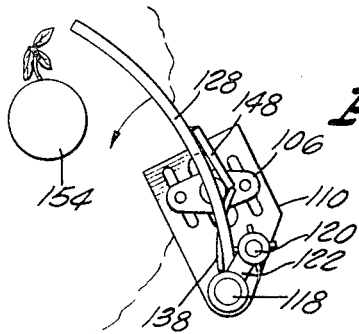
FIG. 8 is a more or less diagrammatic view of the picker head including the fruit comb prior to the engagement of a fruit to be picked.

In FIG. 1 a tractor is shown generally at 14. Suitably mounted thereon is a relatively stationary pivot 16. Extending upwardly from it is a generally upright frame member 18 held against pivotal movement by a brace 20, whose lower end (not shown) is fixed to a portion of the tractor.

Extending forwardly from the pivot 16 is a lower parallelogram lever 22 whose forward end is connected at 24 to a vertical parallelogram member 26 which preferably is parallel to the rear vertical member 18. Connecting the tops of the vertical parallelogram members 18 and 26 is an upper cross member 28 connected at pivots 30 and 32.

Connected to the pivot 16 and a forward portion of the lower parallelogram member 22 is a wide V-brace 34 having a pivotal connection 36 with the forward end of a piston rod 38 suitably reciprocated by an air or hydraulically operated cylinder 40 to swing the upper and lower parallelogram arms 22 and 28 and the forward vertical member 26 upwardly and downwardly.

Extending forwardly from the upper portion of the forward parallelogram member 26 is an arm 42 having an intermediate suspended arm 44 connected by a pivot 46 at its lower end to a forwardly extending relatively short horizontal arm 48. The forward end of the upper arm 42 is connected by a pivot 50 to the upper end of a wide V-shaped arm 52, whose lower end is pivotally connected at 54 to the forward end of the short horizontal arm 48.

The upper arm 42 is pivotally connected at 56 to a bearing unit 58 secured to and swingable about the upper portion of the forward vertical parallelogram member 26. A lever 60 is pivotally connected at 62 to a bearing unit 64 which is secured to and swingable about the lower portion of the forward vertical parallelogram member 26. A piston and cylinder unit 66 is pivotally connected at 68 to a bearing unit 70 which is swingable about said forward vertical parallelogram member 26 intermediate the ends of the latter, and the lower end of the piston and cylinder unit 66 is pivotally connected at 72 to the lower portion of the lever 60. The upper end of lever 60 is pivotally connected at 74 to a lever 76 which is secured to the wide V-shaped member 52. A piston and cylinder unit 78 has one end pivotally connected at 80 to a bearing unit 82, the latter being mounted upon the forward portion of the lower parallelogram member 22 to swing relative to said member about a vertical axis. The other end of the piston and cylinder unit 78 is connected to the bearing unit 64 by suitable pivot or ball joint means indicated at 84. When the piston and cylinder unit 38, 40 is operated to extend the piston rod 38 forwardly, the entire assembly, including parallelogram arms 22, 28 and 26 is swung upwardly carrying with it all of the above described structure mounted upon the forward vertical parallelogram member 26. When the piston and cylinder unit 78 is actuated, the upper arm 42, also arm 48 and levers 52, 60 and 76 will swing about the forward vertical parallelogram member 26. When the piston and cylinder unit 66 is actuated, it will swing the lever 60 upwardly and downwardly relative to the forward vertical parallelogram member 26. This will cause levers 44, 48 and 52 to swing either forwardly and upwardly, or downwardly and rearwardly.

Mounted on the forward end of the forwardly extending short lower arm 48 on a pivot 86 is a picker head assembly generally indicated at 88. This includes a bracket 90 extending generally forwardly from the pivot 86, an electric motor 92, and a suitable speed reduction unit 94 geared to the motor by gears 96 and 98. As shown in FIG. 3, an internal ring gear 100 is suitably secured to the casing of the speed reducer 94. A power shaft 102 extends from the gear reduction unit 94 and has secured on its extending end a hub 104 having a flange 106, the hub being connected to the shaft 102 by means of a shear pin 108. Secured to the flange 106 of the hub 104 is a plate 110 having a medial slot 112 and a pair of slots 114 on either side of the medial slot. The medial slot 112 receives the power shaft 102 therethrough and slots 114 receives suitable clamping bolts 116 by means of which the hub flange 106 is clamped to the plate 110 so that said plate will rotate with the power shaft 102.

Carried by the plate 110 is a comb shaft 118 and a cutter actuator shaft 120, whose outer ends are connected by a suitable connector member 122 which is secured to the comb shaft 118 by a pin 124 and in which the cutter actuator shaft 120 is journalled.

Suitably connected between the lower forwardly projecting arm 48 and the bracket 90, upon which the motor 92 and speed reduction unit 94 are supported, is a piston and cylinder unit 126. When the piston and cylinder unit is actuated it will swing the motor and speed reduction unit, the ring gear 100, comb shaft 118 and cutter actuator shaft 120 about the pivot 86 which carries the bracket 90.

The comb shaft 118 has a plurality of spaced arcuate comb teeth 128 extending therefrom and the inner end of said comb shaft is received in a socket 130 on the plate 110 and secured in said socket by a pin 132. Between each pair of comb teeth 128 on the shaft 118 is a sleeve 134. Each of said sleeves has a radially projecting portion 136 to which a pair of cutter arms 138 is secured as by bolts 140, and each sleeve 134 is mounted for partial rotation upon the comb shaft 118 within limits to be described below. The cutter arms 138 are partially rotatable upon their supporting bolts 140 so that they will swing toward and away from each other, their separated positions being shown in FIG. 2. Adjacent each bolt 140 the base of each cutter arm 138 has a projection 142, and a tension spring 144 has one end connected to the projection 142 and extends around the comb shaft 118 with its other end secured to a pin 146 suitably anchored in the comb shaft 118, so that the cutter arms 138 are biased in a counter-clockwise direction, as viewed in FIG. 3. Secured to each comb tooth 128 is a diagonal guide bar 148, and as shown in FIG. 2, guide bars on adjacent comb teeth extend downwardly and inwardly toward each other to define a guide throat 150 through which the fruit stem is guided to position the stem between the pairs of cutter arms 138. The free ends of the guide bars 148 are so positioned that they are contacted by the outer ends of the cutter arms 138, as shown in FIGS. 2 and 3, to limit the counter-clockwise movement of said cutter arms under the influence of the springs 144.

Figure 7:
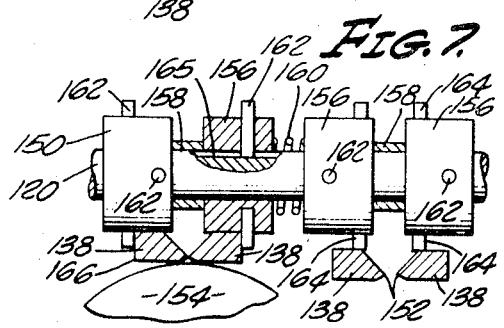
FIG. 7 is a fragmentary sectional view taken approximately on the line 7—7 of FIG. 5.

As shown in FIG. 7, the transverse shape of each cutter arm 138 is such that their cutting edges 152 meet close to the fruit 154, so that the stem of the fruit will be cut off nearly flush with the outer surface of the fruit.

The cutter actuator shaft 120 carries a plurality of radially thick sleeves 156. These sleeves are in pairs, one for each of a pair of cutter arms 138, and are separated by sleeves 158, preferably of lesser diameter than the sleeves 156. Between adjacent sleeves 156 of each pair of such sleeves are compression springs 160.

Each of the sleeves 156 carries pairs of cam pins 162 and 164. The pins 162 lie on a common diameter of the actuator shaft 120 and constitute cutter arm closing cams which ride against angular surfaces 166 on the outer sides of each of the cutter arms 138 to urge the cutter arms together as the actuator shaft 120 rotates in a clockwise direction, as viewed in FIG. 2. Each pair of cam pins 164 lies on a diameter of the actuator shaft 120 at right angles to the common axis of the pins 162. Said cam pins 164 are adapted to bear against the undersides of the cutter arms 138, as viewed in FIG. 3, to raise said cutter arms to the noncutting position of said arms, illustrated in FIG. 3. While the tension springs 144 are provided to bias the cutter arms 138 to said noncutting position, there may be times when a tree branch thicker than the fruit stem might become lodged between the cutter arms and become only partially cut. In such event, the cutter arm return cam pins 164 assure positive return of the cutter arms to their noncutting position, supplementing the tension of the springs 144. Also, in the event such a tree branch should be lodged between the cutter arms, the sleeves 156 which support the cam pins can move a slight distance axially of the actuator shaft 120 against the action of the compression springs 160 on said actuator shaft and relieve excessive pressure of the cutter arm closing cam pins 162 against the cutter arms 138. The sleeves 156 are keyed to the actuator shaft 120 by one of the cam pins 162 on the sleeve. As shown in FIG. 7, one pin 162 is pressed through and held by its sleeve 156 and has its end in a longitudinal slot 165 in the actuator shaft 120.

As stated above, the ring gear 100 is fixed as by bolts 170 to the housing of the gear reduction unit 94. Said ring gear has internal teeth 172 and a side flange 174. Meshing with the teeth 172 of the ring gear 100 is a pinion 182 which is fixed upon the cutter actuator shaft 120, the inner end of the latter being journaled in a bearing 122 fixed to the plate 110. When the power shaft 102 is rotated, it will rotate the plate 110 which carries with it the nonrotating comb shaft 118 and the cutter actuator shaft 120. Through engagement of the pinion 182 with the ring gear teeth 172, the cutter actuator shaft 120 will be rotated, said gears, cutter actuator shaft and plate 110 rotating in the direction of the arrows in FIG. 3.

Figure 9:
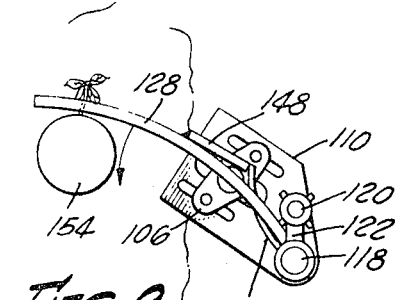
FIG. 9 shows the picker head with the comb in engagement with a fruit.
Figure 4:
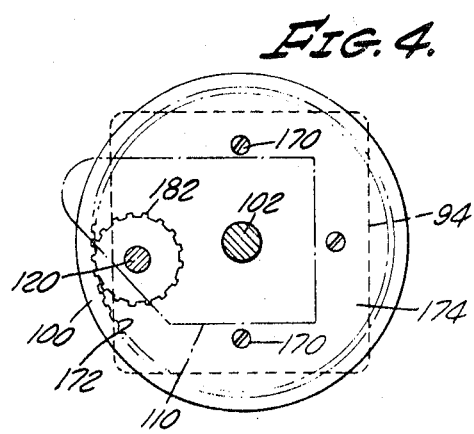
FIG. 4 is a reduced sectional view taken approximately on the line 4—4 of FIG. 2.
Figure 5:
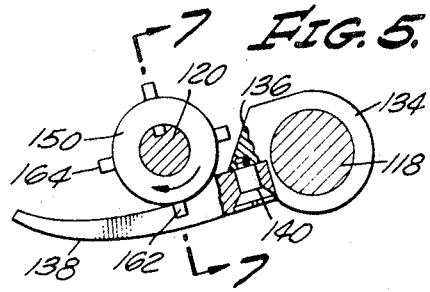
FIG. 5 is a transverse sectional view through the picker head showing the relationship between the cutter actuator and the cutter in stem cutting position.
Figure 10:
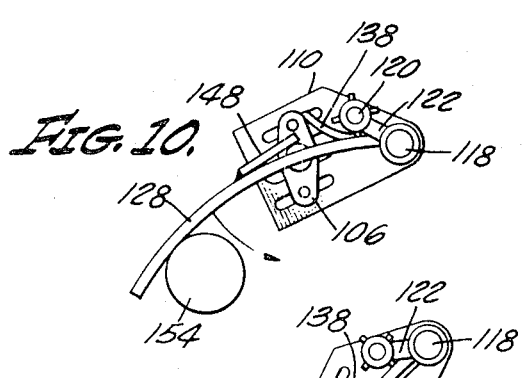
FIG. 10 is a view showing the relationship of the fruit to the cutter head just prior to cutting the stem.
Figure 6:
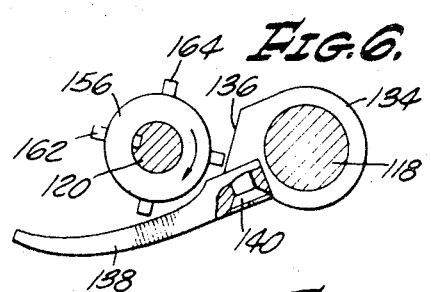
FIG. 6 is a sectional view similar to FIG. 5 with the cutter actuator and a cutter in noncutting position.
Figure 11:
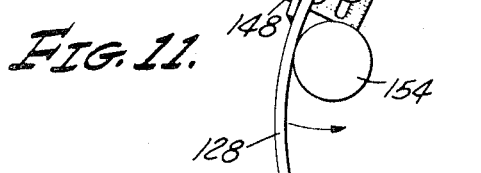
FIG. 11 is a view showing the fruit immediately after cutting of the stem.
Figure 12:
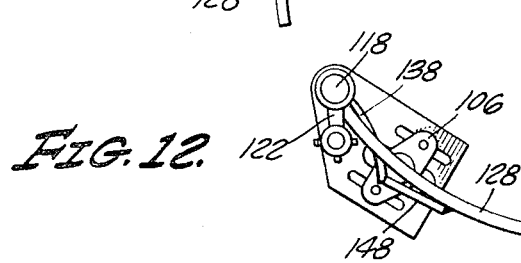
FIG. 12 is a view showing the picked fruit as it leaves the cutter head comb to be deposited in a suitable receiver.

It will be noted that the cutter arms 138 have their upper surfaces, as viewed in FIG. 3, intersecting the upper portions of the comb teeth 128 at a point outwardly from the center of the comb shaft 118, and that this point of intersection of the cutter arms with the comb teeth has a circular orbit adjacent the axis of rotation of the power shaft 102. At the same time the comb shaft 118 and cutter actuator shaft 120 are orbiting about the power shaft 102, the cutter actuator shaft 120 is rotating about its own axis. However, the cutter actuator cams 162 and the cutter arm return cams 164 are out of contact with the cutter arms 138. When a fruit is engaged by the comb teeth 128, as in FIG. 9, continued rotation of the power shaft 102 and plate 110 will bring a pair of comb teeth 128 into engagement with the fruit 154, and as the power shaft and comb teeth continue to rotate as a unit, the fruit will be brought into contact with and swing the cutter arms 138 away from the fruit guides and stops 148, as shown in FIG. 10. This brings the cutter arms 138 into position to be engaged by the cutter arm closing cams 162 to cut off the stem of the fruit, as shown in FIG. 11, at which time the comb teeth 128 will swing from the position of FIG. 11 to the position of FIG. 12, and the fruit will roll gently off the comb teeth into a suitable receiver.

The cutter mechanism can be adjusted to provide for different fruit picking conditions. This adjustment is secured by shifting the plate 110 and with it the comb shaft 118 and the cutter actuator shaft 120 relative to the axis of rotation of the power shaft 102. This is accomplished by loosening the bolts 116, which with the power shaft 102 are located in their respective slots 114 and 112, substituting a pinion 182 of different size, to vary the orbital speed of the comb shaft 118 and likewise vary the orbital radius of the picker head.

If the cutting edges 152 of the cutter arms 138 become worn, they will not close as quickly as before, but the compression springs 160 will keep the cutter arm closing cams 162 in contact with the cutter arms during the closing operation.

From the foregoing it will be seen that the cutter head, including the drive motor 92, gear reduction unit 94, the comb shaft and the cutter actuator shaft, can be manipulated by the tractor operator to raise and lower the cutter mechanism vertically by operation of the piston and cylinder unit 38, 40. They can be moved generally horizontally, inwardly and outwardly of the tree, with the piston and cylinder unit 66; the cutter can be moved vertically at an angle by combined action of the piston and cylinder unit 38, 40 and the unit 66; the levers and arms 42, 48, 52 and 60 can be swung about the axis of the vertical parallelogram member 26, and the cutter assembly with the motor and gear reduction unit can be swung about the vertical pivot 86 independently of the remainder of the supporting structure. Consequently, it is possible to quickly and conveniently reach all parts of the tree and remove the fruit therefrom. If desired, a fruit receiver can be hung beneath the cutter assembly in any suitable manner, or a flexible fruit feed tube can lead to a receiver at a more remote point.

It should of course be understood that various changes can be made in the form, details, arrangement and proportions of the various parts without departing from the spirit of the invention.

I claim:

1. In a fruit picker, a movable support, a picker head carried by said support including a relatively stationary portion and cutter means mounted on and swingable in cycles at least partially orbital relative to said stationary portion, and means adjustably positioning said cutter means relative to said stationary portion to change the radius of its orbit, and a cutter actuator carried by said picker head and movable to actuate said cutter means at time intervals more frequent than those of the orbital cycle of its cutter means, when said cutter means is engaged by fruit.

2. In a fruit picker, a movable support, a picker head carried by said support including a relatively stationary portion and cutter means mounted on and swingable in cycles at least partially orbital relative to said stationary portion, and means adjustably positioning said cutter means relative to said stationary portion to change the radius of its orbit, comb means for feeding fruit to said cutter means movably supported by said relative stationary portion to orbit with said cutter means, and a cutter actuator carried by said picker head and movable to actuate said cutter means at time intervals more frequent than those of the orbital cycle of the cutter means and comb means, when said cutter means is engaged by fruit.

3. In a fruit picker, a movable support, a picker head carried by said support including a relatively stationary portion and cutter means mounted on and swingable in cycles at least partially orbital relative to said stationary portion, and means adjustably positioning said cutter means relative to said stationary portion to change the radius of its orbit, and said picker head having a power shaft carried thereby for rotation relative thereto, said cutter means and a cutter actuator being supported on said power shaft for rotation therewith, and said cutter actuator being movable relative to said power shaft and engageable with said cutter means to actuate the latter.

4. In a fruit picker, a movable support, a picker head carried by said support including a relatively stationary portion and cutter means mounted on and swingable in cycles at least partially orbital relative to said stationary portion, and means adjustably positioning said cutter means relative to said stationary portion to change the radius of its orbit, and said picker head having a power shaft carried thereby for rotation relative thereto, a cutter actuator, comb means, said cutter actuator, cutter means and comb means being supported on said power shaft for rotation therewith, and said cutter actuator being movable relative to said power shaft and engageable with said cutter means to actuate the latter.

5. In a fruit picker, a picker head having a relatively stationary portion, a power shaft carried by said relatively stationary picker head portion, cutter means carried by said power shaft for rotation therewith, cutter actuating means also being mounted for movement relative to the power shaft, and means interposed between said power shaft and said cutter actuating means for imparting movement to the cutter actuating means in addition to its rotation with said power shaft.

6. The structure in claim 5, and said cutter means being at least partially orbitally rotatable about said power shaft, and said interposed means being adjustably positioned relative to said power shaft to vary the radius of the orbit of said cutter means about said power shaft.

References Cited

UNITED STATES PATENTS

| 536,695 | 4/1895 | Hall | 56—293 |
| 1,241,411 | 9/1917 | McNeill | 56—333 |
| 1,329,481 | 2/1920 | Thorness | 56—335 |
| 1,883,101 | 10/1932 | Tervo | 56—19 |

HUGH R. CHAMBLEE, Primary Examiner